A. STURGIS.
SEASONING ATTACHMENT FOR MEAT CHOPPING MACHINES.
APPLICATION FILED APR. 13, 1914.
1,110,515.
Patented Sept. 15, 1914.
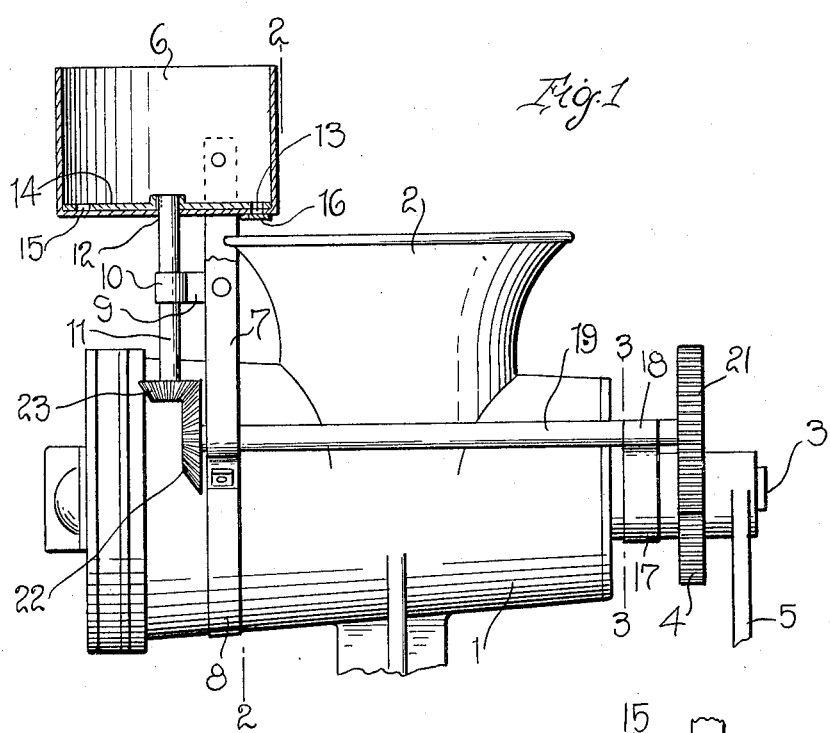
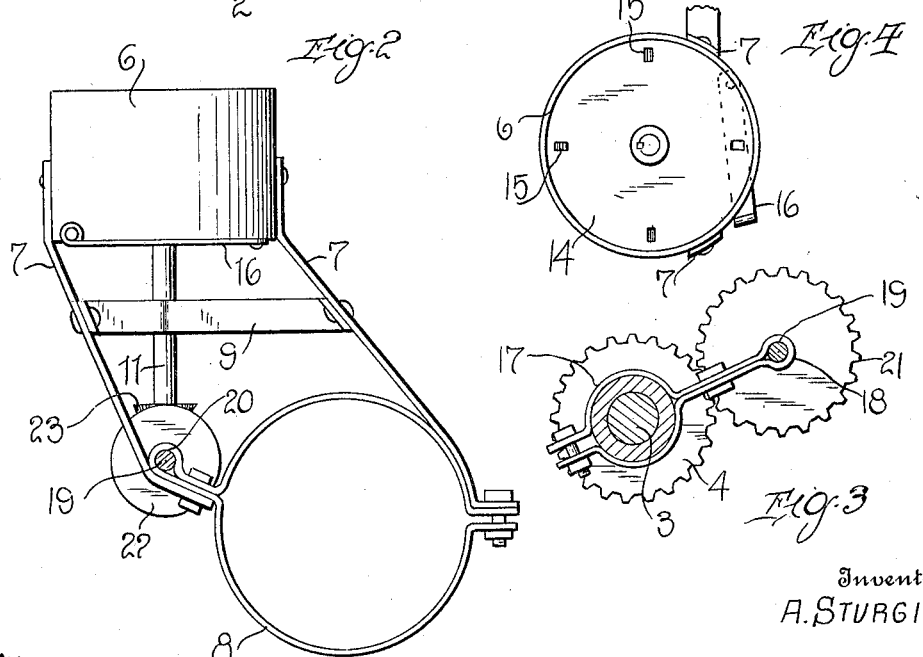
Inventor
A. STURGIS
By Watson E. Coleman
Attorney
Witnesses
Robert M. Sutphen
A. L. Hued.

UNITED STATES PATENT OFFICE.

ALBERT STURGIS, OF GRIFFIN, INDIANA.

SEASONING ATTACHMENT FOR MEAT-CHOPPING MACHINES.

1,110,515.  Specification of Letters Patent.  Patented Sept. 15, 1914.

Application filed April 13, 1914. Serial No. 831,555.

*To all whom it may concern:*

Be it known that I, ALBERT STURGIS, a citizen of the United States, residing at Griffin, in the county of Posey and State of Indiana, have invented certain new and useful Improvements in Seasoning Attachments for Meat-Chopping Machines, of which the following is a specification, reference being had to the accompanying drawings.

This invention relates to attachments for meat chopping machines, and more particularly to an attachment by means of which the meat in the machine is automatically seasoned.

An object of this invention is the provision of an attachment for chopping machines, in which means are provided for depositing the seasoning carried in a container automatically into the body of the chopper upon rotation of the mechanism shaft of the machine.

A further object of this invention is the provision of an attachment of this character which comprises a container having an outlet opening in the bottom thereof, the container having a disk valve rotatably mounted therein which is provided with a series of openings adapted to register with the outlet opening of the container to allow the seasoning to pass from the container into the chopping machine upon rotation of the disk valve, means being operatively connected to the disk valve whereby the same is rotated upon rotation of the mechanism shaft of the chopper.

A still further object of this invention is the provision of a seasoning attachment of this character which may be quickly and easily attached to the body of a meat chopping machine, so that the container of the attachment is disposed above the hopper of the machine with the outlet opening of the container registering with the interior of the hopper and with the valve disk within the container operatively connected to the gear wheel mounted on the operating shaft of the chopping machine.

With these and other objects in view, my invention consists in the novel construction, combination, and arrangement of parts to be hereinafter more fully described, claimed, and illustrated in the accompanying drawing, in which, Figure 1 is a side elevation of a chopping machine showing my improved attachment connected thereto; Fig. 2 is a sectional view on the line 2—2 of Fig. 1; Fig. 3 is a sectional view on the line 3—3 of Fig. 1; and Fig. 4 is a top plan view of the seasoning container.

Referring more particularly to the drawing, the numeral 1 designates the body of a meat chopping machine, 2 the hopper thereof, and 3 the projecting end of the rotatable shaft for operating the chopping mechanism (not shown) of the machine, the projecting portion of the shaft having a gear wheel 4 keyed thereon, and a handle 5 for rotating the shaft. Disposed above the hopper 2 of the chopping machine is a seasoning container 6 which is supported upon a pair of vertical standards 7 which are connected at their lower ends to a clamping member 8 which is adapted for engagement around the body of the machine to one side of the hopper, whereby the container is maintained in its proper position. The standards 7 are connected below the container 6 by means of a cross bar 9 which is looped intermediate of its ends as at 10 to provide a journal or rotatable drive shaft 11, the upper end of which projects into the body of the container through the central opening 12 formed therein. It will be seen, from the drawing, that the container is disposed in such a manner that one side thereof projects slightly above the hopper 2, and the portion of the container disposed over the hopper is provided with an outlet opening 13 in the bottom thereof through which the seasoning within the container is adapted to pass into the hopper. Keyed to the upper end of the drive shaft 11 within the container 6 is a disk valve 14 which is provided adjacent its marginal edge with a series of openings 15, the openings being adapted to successively register with the outlet opening 13 in the bottom of the container. Pivotally connected to the lower face of the bottom of the container is a cut-off valve 16 which is adapted to be swung to a position to close the outlet opening 13 in the container to prevent discharge of the material therefrom to the machine.

A bracket 17 is mounted on the operating shaft 3 of the machine, the bracket being disposed upwardly and outwardly, the upper end thereof being looped as at 18 to form a journal for one end of a transmission shaft 19, the shaft 19 being journaled adjacent its opposite end within a loop 20 formed on the clamping member 8. Keyed to the oppositely projecting ends of the transmission shaft are the gear wheels 21 and 22, the gear wheel 21 meshing with the gear wheel 4 on the shaft 3, and the gear wheel 22 meshing with a pinion 23 on the lower end of the drive shaft 11.

The operation of my improved device is as follows:—With the container secured in the desired position by the clamping member 8 as heretofore described, so that the pinion 23 on the lower end of the drive shaft 11 meshes with the gear wheel 22 on the transmission shaft and the gear wheel 21 on the opposite end of the transmission shaft meshing with the gear wheel 4 on the operating shaft of the machine, it will be seen that upon rotation of the handle 5 of the shaft 3, the disk valve 14 in the container will be rotated through the medium of said gearing and shafts. Presuming that the meat to be chopped is disposed within the machine, and the seasoning material is carried in the container, upon rotation of the operating shaft 3 to chop the meat, the rotation of the disk 14 successively moves the openings 15 into alinement with the outlet opening 13 in the container to allow a portion of the seasoning to pass from the container into the machine whereby it is automatically mixed with the meat. The quantity of seasoning discharged into the machine through the openings 15 registering with the opening 13 may be regulated by the cut-off valve 16 which may be disposed to partially close the outlet opening 13, and the passage of seasoning to the machine may be entirely cut off by disposing the cut-off valve directly across the opening 13 to close the same.

From the above description, taken in connection with the accompanying drawings, it will be seen that I have provided an attachment by means of which the meat being chopped by the machine may be automatically seasoned to desired degree, this operation being attained by mechanism which may be quickly attached to or detached from the chopping machine, and which comprises a minimum number of parts whereby the same may be cheaply manufactured, and at the same time be extremely efficient in use.

Having thus fully described my invention, what I desire to secure and claim by Letters Patent is:—

In combination with a meat chopper, a seasoning attachment comprising a rotatable shaft, a bracket detachably connected to one end of the machine for supporting one end of said shaft, a second bracket detachably connected to the other end of the machine for supporting the opposite end of said shaft, standards connected to said second bracket, a dropping device for seasoning supported upon said standards, means for operatively connecting the first mentioned end of said shaft with the operating shaft of the machine, and means for operatively connecting the second mentioned end of the shaft with the dropping device, whereby upon rotation of the operating shaft of the machine, the dropping device is actuated.

In testimony whereof I hereunto affix my signature in the presence of two witnesses.

ALBERT STURGIS.

Witnesses:
C. N. GARRETT,
JESSE M. SHELLEY.

---

Copies of this patent may be obtained for five cents each, by addressing the "Commissioner of Patents, Washington, D. C."